United States Patent [19]

Bojstrup et al.

[11] Patent Number: 5,350,478
[45] Date of Patent: Sep. 27, 1994

[54] METHOD OF MANUFACTURING A WASHABLE, DIRT BINDING NAP MAT HAVING A RUBBER BACKING AND NAP FREE RUBBER EDGES

[75] Inventors: Flemming Bøjstrup; Helle B. Petersen, both of Aarhus; Peter H. Sörensen, Hornslet, all of Denmark

[73] Assignee: Milliken Research Corporation, Spartanburg, S.C.

[21] Appl. No.: 972,369

[22] Filed: Nov. 5, 1992

[30] Foreign Application Priority Data

Mar. 8, 1991 [DK] Denmark ................................ 422/91

[51] Int. Cl.⁵ ........................ A47G 27/02; B29C 35/00
[52] U.S. Cl. ............................... 156/299; 156/72; 156/307.7; 15/215; 428/92; 428/95
[58] Field of Search ............... 156/297, 72, 299, 307.1, 156/307.7; 428/91-93, 95; 15/215, 217

[56] References Cited

U.S. PATENT DOCUMENTS

| | | | |
|---|---|---|---|
| 1,409,125 | 3/1922 | Stanwood | 15/215 |
| 3,206,785 | 9/1965 | Heil | 15/215 |
| 3,435,480 | 4/1969 | Mann, Jr. | 15/215 |
| 4,082,874 | 4/1978 | Traylor, Jr. | 428/95 |
| 4,435,451 | 3/1984 | Neubert | 428/95 |
| 4,439,475 | 3/1984 | Lang | 428/92 |
| 4,581,273 | 4/1986 | Lang | 428/92 |
| 4,707,895 | 11/1987 | Lang | 428/92 |

FOREIGN PATENT DOCUMENTS 159141  9/1990  Denmark .

*Primary Examiner*—Jeff H. Aftergut
*Attorney, Agent, or Firm*—Terry T. Moyer; Earle R. Marden

[57] ABSTRACT

Method for the manufacture of a nap mat having a rubber backing with nap free rubber edge zones, whereby the nap layer is fastened into a woven and/or non-woven primary texture which along with the nap layer is fastened to the upper side of an unvulcanized rubber backing by a press vulcanizing operation. Placing rubber strips in total or partial abutment against the underside of the rubber backing, before the press vulcanizing operation is initiated, so that said strips during the press vulcanizing operation are joint vulcanized with the rubber backing so that they form integrated parts thereof.

6 Claims, No Drawings ated, the said strips being placed so that they extends as
METHOD OF MANUFACTURING A WASHABLE, DIRT BINDING NAP MAT HAVING A RUBBER BACKING AND NAP FREE RUBBER EDGES The invention relates to a method for the manufacture of a washable, dirt binding nap mat having a rubber backing with nap free rubber edge zones, whereby the nap layer has been fastened into a woven and/or non-woven primary texture, which along with the nap layer is fastened to the upper side of an unvulcanized rubber backing by means of a press vulcanizing operation, during which operation the unvulcanized rubber is pressed by means of a press diaphragm and is heat vulcanized when the underside of the rubber backing is lying abutting against a molding plate.

In nap mats of this kind the rubber backing normally has a thickness of 1–5 mm, which by large nap mats of several square meters makes the mat relatively heavy to handle. It has been attempted to eliminate said drawback by making the rubber backing thinner, but as a consequence thereof the nap mat will totally or partly loose its nap free protruding rubber edges after relatively few washing operations.

It is the purpose of the present invention to provide a method for the manufacture of a nap mat having a rubber backing and nap free rubber edges, where the rubber backing can be made all over thinner than the known thicknesses of 1–5 mm, and whereby the edges of the nap free rubber are just as resistant as the rest of the nap mat. In other words, the inner edges of the nap free rubber backing edge zone are intended to be tear resistant.

This purpose is obtained by a method of the mentioned kind, whereby rubber strips are placed in total or partial abutment against the underside of the rubber backing before the press vulcanizing operation is initiated, the said strips being placed so that they extends as well along the edge zone of the rubber backing as below the encircling edge of the nap layer, and whereby said strips during the press vulcanizing operation are joint vulcanized with the rubber backing, so that they become integral parts thereof.

The finished mat does not get thicker or considerably thicker in its rubber backing below the edge of the nap area than below the remaining nap area, so that it does not present a locally increased thickness which could explain the increased tear resistant or mat edge strength. This good result is presumably due to the fact that the additional strips during the press vulcanizing operation render the rubber in the strip zone of the backing a little more resistant to a local compression, especially below the side edges of the nap area. By the above method is achieved tear resistant mats with rubber backing thicknesses as low as 0.5 mm.

A further advantage by the method is that waste products from earlier manufactured mats in the form of the socalled trim surplus can be used as said rubber strips. Such trim surplus is e.g. obtained from too broad or wide rubber edges, a part of which being cut off after the press vulcanizing operation of the mat. Said trim surplus may be obtained from the production of partly vulcanized mats, whereby the edge surplus is cut off before the subsequent final vulcanization, but the trim surplus most likely is obtained from cutting off or cutting clean surplus parts of the rubber edge from mats having been finally vulcanized.

In the latter case it is a special embodiment of the method that the rubber strips are partly or totally vulcanized when they are placed lying abutting against the underside of the unvulcanized rubber backing. It has been found, however, that a good edge reinforcement effect is obtained if the rubber strips are unvulcanized when they are placed as mentioned above lying abutting against the underside of the unvulcanized rubber backing.

In an embodiment of the method the cross section of the unvulcanized rubber strips are approximately triangular, one of the cross sectional angles being between 0 and 20 degrees, preferably 6 degrees.

The rubber strips are preferably made in a length of the same size as the length of the nap edge in a length of the question. The leading and trailing end edges of each rubber strip are preferably made so that they form an angle of 45 degrees with the side edges of the strip.

With end edges thus forming 45 degrees with the longitudinal edges of the rubber strips these may be arranged in two different ways below the edges of the mat nap area. In one way the end edges of the adjacent strip in a mat corner are practically merging or abutting in the mitre joint. In the other way the end edges of the rubber strips adjacent to each other in a corner are flushing with each other, so that in every mat corner is thereby provided a space for a right-angled, triangular rubber piece to be placed in a small distance from the end edges of the rubber strips in each mat corner together with the ends of the rubber strips lying abutting against the underside of the rubber backing and below each corner of the edges of the nap layer. These rubber pieces have hypotenuses at an angle of 45° to the sides of said pieces and same thickness as the strips.

The effect according to the invention of increasing the strength of the inner edge of the nap free rubber backing zone may be further increased if the rubber strips intended for the edge reinforcement before the press vulcanizing operation and in their unvulcanized condition are manufactured with an embedded woven or non-woven material being arranged at least in strip zones which during the press vulcanization operation extend below the edge of the nap layer. Thereby the vulcanization pressure exerted on the nap edge is distributed over a larger area, resulting in a lower nap edge pressure, and the nap free rubber backing edges of the nap mat become more resistant against separation from the remaining mat, although the greatest rubber thickness of the mat is less than 1 mm after the press vulcanizing operation. As a consequence of the woven or no-woven material embedded in the rubber strips is achieved—beyond a considerably more tear off resistant nap free rubber backing edge of the nap mat—also a structurally very free choice regarding the assembling of the mat on a mounting plate, seeing that the rubber strips before the press vulcanizing operation may be arranged either below the rubber backing of the mat or may instead be arranged directly between the primary texture carrying the nap, and the unvulcanized rubber backing, i.e., thereupon and slightly overlapping along its edges. Thereby the nap carrying primary texture by means of the vulcanization is fastened to the said edge strips, and thereby the nap edge may get into contact with the embedded woven or non-woven material of these strips and thereby the edge of the nap carrying primary texture may avoid to be pressed too deeply into the underlying rubber backing.

We claim:

1. Method for the manufacture of a nap mat having a nap layer upper surface and a rubber backing for the nap layer with nap free rubber edge zones comprising the steps of: laying down an unvulcanized rubber backing sheet, placing a nap layer on top of said rubber sheet, placing a vulcanized strip of rubber under each edge of the unvulcanized rubber sheet with a portion of the strip extending outwardly from the unvulcanized rubber and heat vulcanizing the rubber sheet, the strips and the nap layer to form a nap mat with tear resistant unnapped edge portions.

2. The method of claim 1 wherein the leading and trailing edges of each of the strips are cut at an angle of approximately 45° with the side edges of the strip.

3. The method of claim 2 wherein additional rubber pieces in the form of right triangles with equal acute angles of approximately 45° are placed against the cut edges of the strips and vulcanized thereto during vulcanization of the mat.

4. The method of claim 3 wherein the strips of rubber are triangular shaped in cross-sections.

5. The method of claim 4 wherein one of the angles of the triangular shaped strips is in the range of 0°–20°.

6. The method of claim 1 wherein the strips of rubber are triangular in cross-section with one of the angles being in the range of 0°–20°.

* * * * *